(12) United States Patent
Li et al.

(10) Patent No.: US 11,003,028 B2
(45) Date of Patent: May 11, 2021

(54) PHOTO-ALIGNMENT APPARATUS THAT REALIZES DESIRABLE DISTRIBUTION THROUGH SINGLE EXPOSURE AND METHOD OF MANUFACTURING AN OPTICAL ELEMENT

(71) Applicant: SHANGHAI JIAO TONG UNIVERSITY, Shanghai (CN)

(72) Inventors: Yan Li, Shanghai (CN); Yikai Su, Shanghai (CN)

(73) Assignee: SHANGHAI JIAO TONG UNIVERSITY, Shanghai (CN)

(*) Notice: Subject to any disclaimer, the term of this patent is extended or adjusted under 35 U.S.C. 154(b) by 0 days.

(21) Appl. No.: 16/817,258

(22) Filed: Mar. 12, 2020

(65) Prior Publication Data

US 2020/0209691 A1  Jul. 2, 2020

Related U.S. Application Data

(63) Continuation-in-part of application No. PCT/CN2019/082347, filed on Apr. 12, 2019.

(30) Foreign Application Priority Data

Jun. 7, 2018 (CN) .......................... 201810583633.8

(51) Int. Cl.
  *G02F 1/1337* (2006.01)
  *G02F 1/11* (2006.01)
  *G02F 1/13363* (2006.01)
  *G02F 1/137* (2006.01)

(52) U.S. Cl.
  CPC ........ *G02F 1/133788* (2013.01); *G02F 1/116* (2013.01); *G02F 1/137* (2013.01); *G02F 1/13363* (2013.01); *G02F 2001/133638* (2013.01); *G02F 2202/40* (2013.01)

(58) Field of Classification Search
  CPC .................. G02F 1/133788; G02F 1/1303
  See application file for complete search history.

(56) References Cited

U.S. PATENT DOCUMENTS

| 2012/0092668 A1* | 4/2012 | Du | ....................... G02F 1/0136 356/364 |
| 2019/0155108 A1* | 5/2019 | Zhao | ................ G02F 1/133528 |

* cited by examiner

*Primary Examiner* — Alexander P Gross
(74) *Attorney, Agent, or Firm* — Getech Law LLC; Jun Ye

(57) ABSTRACT

The present invention discloses a photo-alignment apparatus that realizes a desirable distribution through a single exposure and a method of manufacturing an optical element. The photo-alignment apparatus comprises a light source, a linear polarization film, a pixelated electronic-control phase retarder, and a phase retardation plate; the light source is used to provide light for a exposure; the linear polarization film is configured to convert the light emitted by the light source into a linearly-polarized light having a polarization direction parallel to the direction of the transmission axis of the linear polarization film; the pixelated electronic-control phase retarder is configured to generate phase retardations distributed in a desirable pattern; and the phase retardation plate is used to generate a non-pixelated phase retardation. With this photo-alignment apparatus, a polarization distribution of a desirable pattern can be generated, and a corresponding alignment profile can be formed on a polarization sensitive medium.

20 Claims, 5 Drawing Sheets

PHOTO-ALIGNMENT APPARATUS THAT REALIZES DESIRABLE DISTRIBUTION THROUGH SINGLE EXPOSURE AND METHOD OF MANUFACTURING AN OPTICAL ELEMENT

CROSS-REFERENCES TO RELATED APPLICATIONS

This application is a continuation-in-part (CIP) application of PCT International Application No PCT/CN2019/082347, filed on Apr. 12, 2019, which claims priority to Chinese patent application No. 201810583633.8, entitled "OPTICAL ORIENTATION APPARATUS FOR ACHIEVING ARBITRARY DISTRIBUTION THROUGH SINGLE EXPOSURE AND METHOD FOR PREPARING OPTICAL ELEMENT", filed with the State Intellectual Property Office of People's Republic of China on Jun. 7, 2018, the entire contents of which are incorporated herein by reference. The above PCT International Application was published in the Chinese as International Publication No. WO2019233178 A1.

TECHNICAL FIELD

The present invention relates to optical technology, and particularly to a photo-alignment apparatus that realizes a desirable distribution through a single exposure and method of manufacturing an optical element.

BACKGROUND

Liquid crystal has been widely used in liquid crystal display technology, tunable liquid crystal photonic devices and the like, due to its advantages such as large optical anisotropy, low power consumption, light weight, and easy control in electrical, optical, and magnetic manners. However, in order to orientate the liquid crystal, an alignment layer is usually required to make the liquid crystal director (probability statistical direction of the local liquid crystal optic axis) arranged in a certain direction. The traditional alignment is generally obtained by rubbing on a thin layer of a polymer material, which will cause environmental pollution, and the uniformity of the orientation obtained by rubbing is low. Recently, a photo-alignment technology, which uses the polarization direction of light to control the alignment direction of polarization-sensitive medium and thus further control the direction of liquid crystal directors, becomes increasingly mature and has begun to be applied to some commercial products (such as small sized in-plane driven LCD panel). In the photo-alignment technology, the alignment of liquid crystal is controlled by light in a non-contact way, so that it has advantages such as environmental friendliness, easy realization, better uniformity and so on. Therefore, it is the future trend of liquid crystal alignment.

Another advantage of photo alignment as compared with the traditional rubbing alignment is that liquid crystals in different regions can be aligned in different directions. As a result, it can be applied to three-dimensional display based on patterned phase retardation plate, security and confidential document display, geometric phase liquid crystal holograms, and the like.

The geometric phase hologram (GPH) can be regarded as a stitching of multiple phase retardation plates with respective optic axis that varies spatially. The phase distribution in space is formed by the spatial variation of the optic axis. It has the advantages of high diffraction efficiency, insensitivity to wavelength and angle, etc. It can be widely used in fields such as beam deflection, holographic imaging, and augmented reality glasses. Geometric phase holograms can be prepared in the following ways:

The first way is to use two beams of circularly polarized light with opposite handedness for holographic interference so as to generate linearly polarized light having a polarization direction that varies in space. When the polarization-sensitive medium is exposed to the interference pattern, it is aligned accordingly based on the polarization direction of the light. In this way, it is difficult to generate an optic axis spatial arrangement with a desirable distribution pattern.

The second way is to expose the polarization-sensitive medium to the ultraviolet light that passes through one or more masks. The alignment distribution formed in this way is completely determined by the mask pattern. It is required to replace or move the mask for designing a new alignment distribution. Polarization selection of UV light is generally achieved by mechanically rotating a linear polarization film. As only one polarization direction can be achieved per exposure, in order to obtain more alignment directions, more exposures are needed.

There is another method using Digital Micromirror Devices (DMD). The required mask pattern can be generated quickly by refreshing the intensity distribution on the DMD. With this method there is no need to physically produce a new mask, and thus it is easier to achieve the alignment distribution of various patterns. However, in this way, the polarization direction of the light is still controlled by mechanically rotating the linear polarization film. Therefore, multiple exposures are still needed to complete the light alignment of a complex pattern.

There is another method for preparing photo-alignment and geometric phase hologram by laser direct writing. By using two-dimensional mechanical scanning and polarity selector, the hologram or alignment are completed with point by point exposures. The higher the resolution of the hologram is, the more times of direct writing are needed. If the resolution is 100×100, 10000 exposures are required.

SUMMARY

In order to overcome the disadvantages in the prior art, the present invention provides a photo-alignment apparatus that realizes desirable distribution through a single exposure and method of manufacturing an optical element. By designing the relative optic axis directions of a linear polarization film, a pixelated electronic-control phase retarder, and a phase retardation plate, and by designing the phase retardation value of each phase retarder, a polarization pattern of desirable distribution can be generated, and a corresponding alignment profile can be formed on a polarization sensitive medium. The polarization sensitive medium affects the optical anisotropic medium and thus a geometric phase hologram apparatus of desirable phase distribution can be generated.

In order to achieve the above-mentioned objectives of the invention, the technical solutions adopted to solve its technical problems are as follows:

The present invention discloses a photo-alignment apparatus that realizes desirable distribution through a single exposure, comprising a light source, a linear polarization film, a pixelated electronic-control phase retarder, and a phase retardation plate, which are sequentially arranged in space, wherein:

the light source is used to provide light for photo-alignment exposure;

the linear polarization film is configured to convert the light emitted by the light source into linearly-polarized light having a polarization direction parallel to the direction of the transmission axis of the linear polarization film;

the phase retardation of each pixel of the pixelated electronic-control phase retarder is controlled by a corresponding voltage, so as to generate phase retardations distributed in a desirable pattern; and the phase retardation plate is used to generate a non-pixelated phase retardation.

Further, one or more optical elements may be added before, after, or between the linear polarization film, the pixelated electronic-control phase retarder, and the phase retardation plate.

Preferably, the one or more optical elements includes at least one of a lens, a lens group, a reflector, an attenuation sheet, an aperture, a phase retarder, a polarizer, a beam expander, a filter, a prism, an optical window, an optical substrate, a beam displacement optical element, a diffractive optical element or a polarization rotation apparatus.

Further, the phase retardation of the phase retardation plate is between $\pi/4+m\pi$ and $\frac{3}{4}\pi+m\pi$, where m is an integer.

Preferably, the phase retardation of the phase retardation plate is an odd multiple of $\pi/2$.

Further, the angle between the direction of the transmission axis of the linear polarization film and the polarization direction of the extraordinary beam incident vertically into the pixelated electronic-control phase retarder is in a range of 30°-60°, in a range of −60° to −30°, in a range of 120° to 150°, or in a range of −150° to −120°.

Preferably, the angle between the direction of the transmission axis of the linear polarization film and the polarization direction of the extraordinary beam incident vertically into the pixelated electronic-control phase retarder is 45°, −45°, 135°, or −135°.

Further, the angle between the direction of the transmission axis of the linear polarization film and the direction of the slow axis of the phase retardation plate is in a range of 30° to 60°, in a range of −60° to −30°, in a range of 120° to 180°, or in a range of −180° to −120°.

Preferably, the angle between the direction of the transmission axis of the linear polarization film and the direction of the slow axis of the phase retardation plate is 45°, −45°, 135°, or −135°.

Further, the pixelated electronic-control phase retarder is a liquid crystal device. The initial alignment of the liquid crystal device is horizontal alignment on both sides, or vertical alignment on both sides, or horizontal alignment on one side and vertical alignment on the other side.

Further, the pixelated electronic-control phase retarder is a transmission type phase retarder or a reflection type phase retarder.

Further, the light source emits ultraviolet light or visible light.

Further, the light source includes a laser or an LED.

The present invention further discloses a method of manufacturing an optical element. The optical element is manufactured by using any one of the above-mentioned photo-alignment apparatus which can realize desirable distribution of the polarization direction through a single exposure. The optical element includes a polarization-sensitive medium and an optical anisotropic medium; and the optical anisotropic medium has a local optic axis orientation profile which can be distributed in a desirable pattern. The method of manufacturing the optical element includes the following steps:

generating an optic axis orientation profile in the polarization-sensitive medium by the photo-alignment apparatus; and determining the local optic axis orientation profile of the optical anisotropic medium by the optic axis orientation profile in the polarization-sensitive medium.

Further, the electro-optical property of the optical element can be controlled via a voltage.

Further, the polarization-sensitive medium and the optical anisotropic medium are two separated layers of medium, one layer of mixture of two kinds of media, or the same media has both polarization-sensitive property and optical anisotropy.

Further, the polarization-sensitive medium and the optical anisotropic medium are both exposed to the light output from the photo-alignment apparatus. Alternatively, the optical anisotropic medium is not exposed to the light output from the photo-alignment apparatus, but is added into the optical element after a previous exposure.

Further, the polarization-sensitive medium is a photo-alignment material or an azobenzene polymer, and the optical anisotropic medium is a liquid crystal, a liquid crystal polymer, or an azobenzene polymer.

By employing the technical solution above, the present invention, as compared with the prior art, has the following advantages and positive effects:

By designing the relative optic axis directions of a linear polarization film, a pixelated electronic-control phase retarder, and a phase retardation plate, and by assigning a phase retardation value to each phase retarder, a polarization pattern of desirable distribution can be generated, and a corresponding alignment profile can be formed on a polarization sensitive medium. The polarization-sensitive medium affects the optical anisotropic medium and thus a geometric phase hologram apparatus of desirable phase distribution can be generated. In the present invention, the polarization pattern of a desirable shape and geometric phase hologram apparatus of a desirable phase distribution can be realized through only one single exposure, which greatly simplifies the manufacturing process of the element. In the present invention, by accurately controlling the voltage distribution on the pixelated electronic-control phase retarder, through only one exposure, the optical polarization and the local optic axis of the anisotropic medium can be controlled to vary continuously in any directions. In the present invention, the polarization pattern of a desirable shape can be refreshed in real time by computer-controlled pixelated electronic-control phase retarder, without the need to produce a new photomask each time, which greatly reduces the production costs.

BRIEF DESCRIPTION OF THE DRAWINGS

In order to explain the technical solution of the embodiment of the present invention more clearly, the accompanying drawings used in the description of the embodiment will be briefly introduced below. Obviously, the drawings described below are merely embodiments of the present invention and other different drawings may be obtained by those skilled in the art without departing from the inventive work. In the drawings.

DESCRIPTION OF THE REFERENCE SIGNS

1—linear polarization film;
2—pixelated electronic-control phase retarder;
3—phase retardation plate;
4—polarization-sensitive medium;
5—splitting prism;
6—reflection type pixelated electronic-control phase retarder;
51—photo-alignment layer;
52—ITO glass;
53—liquid crystal; and
54—polarization-sensitive medium.

DETAILED DESCRIPTION OF EMBODIMENTS

In the following, the technical solutions in the embodiments of the present invention will be described and discussed clearly and completely with reference to the accompanying drawings. Obviously, what is described here is only part, rather than all, of the examples of the present invention. Based on the described embodiments herein, those skilled in the art can obtain other embodiment(s), without any inventive work, which should be within the scope of the present invention.

Embodiment 1

Figure 1:
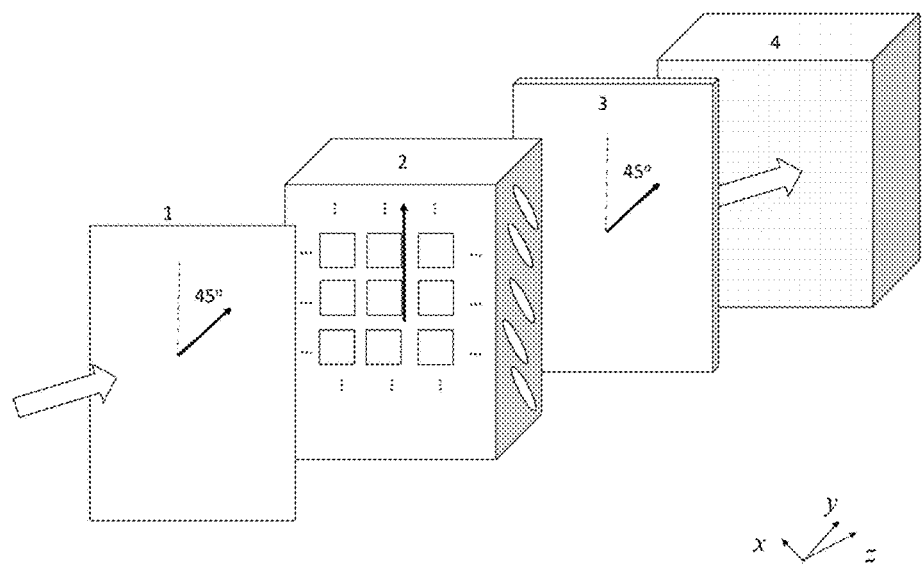
FIG. 1 is a schematic view of an apparatus according to Embodiment 1 of the present invention.

As shown in FIG. 1, the present invention discloses a photo-alignment apparatus capable of realizing a desirable distribution through a single exposure. The photo-alignment apparatus includes a light source, a linear polarization film 1, a pixelated electronic-control phase retarder 2, and a phase retardation plate 3, which are sequentially arranged in space, wherein:

the light source is used to provide light required for photo-alignment exposure;

the linear polarization film 1 is configured to turn the light emitted by the light source into linearly-polarized light having a polarization direction parallel to the direction of the transmission axis of the linear polarization film 1;

the phase retardation of each pixel of the pixelated electronic-control phase retarder 2 is controlled by a corresponding voltage, so as to generate phase retardations distributed in a desirable pattern; and the phase retardation plate is used to generate a non-pixelated phase retardation.

In this embodiment, the light emitted by the light source passes through the linear polarization film (polarizer) 1, the pixelated electronic-control phase retarder 2, the phase retardation plate 3 sequentially and then is projected onto the polarization-sensitive medium 4. In the drawings, the direction of the transmission axis of the linear polarization film 1, the polarization direction of extraordinary beam in the pixelated electronic-control phase retarder 2, and the direction of the slow axis of the phase retardation plate 3 are shown by arrows. A coordinate system is created with the propagating direction of light being z axis, with the direction of the slow axis of the quarter wave plate being y axis, with the direction of the fast axis of the quarter wave plate being x axis. The direction of the transmission axis of the linear polarization film is also the direction of the y axis, and the polarization direction of the extraordinary light in the pixelated electronic-control phase retarder 2 is in the x-y plane and at an angle of 45° with the y axis.

By the photo-alignment apparatus, only one exposure is required to create a local optic axis orientations profile in the polarization-sensitive medium 4. The phase retardations of each pixel of the pixelated electronic-control phase retarder 2 are controlled by respective voltage. The light incident on the polarization-sensitive medium 4 is linearly polarized or elliptically polarized, and the polarization direction or the long axis direction of the elliptical polarization can be controlled by the pixelated electronic-control phase retarder 2 on the pixel level.

Further, one or more optical elements may be disposed before, after, or between the linear polarization film 1, the pixelated electronic-control phase retarder 2, and the phase retardation plate 3, which would not affect the apparatus according to the present application to realize a pattern of desirable polarization distribution. Preferably, the optical element is a lens, a lens group, a reflector, an attenuation sheet, an aperture, a phase retarder, a polarizer, a beam expander, a filter, a prism, an optical window, an optical substrate, a beam displacement optical element, diffractive optical element and/or polarization rotation apparatus. Particularly, when a lens group is disposed at a desirable position after the pixelated electronic-control phase retarder 2, the light spot emitted by the pixelated electronic-control phase retarder 2 can be enlarged or reduced. In particular, reducing the light spot can accordingly reduce the image size of the pixel of the pixelated electronic-control phase retarder 2, so that the spatial resolution of the obtained geometric phase hologram is improved.

Further, the phase retardation of the phase retardation plate 3 is between $\pi/4+m\pi$ and $3/4\pi+m\pi$, where m is an integer. Preferably, the phase retardation of the phase retardation plate 3 is an odd multiple of $\pi/2$. That is, it is a quarter wave plate.

Further, the angle between the direction of the transmission axis of the linear polarization film 1 and the polarization direction of the extraordinary light vertically incident into the pixelated electronic-control phase retarder 2 is in the range of 30°-60°, in the range of −60° to −30°, in the range of 120° to 150°, or in the range of −150° to −120°. Preferably, the angle between the direction of the transmission axis of the linear polarization film 1 and the polarization direction of the extraordinary light vertically incident into the pixelated electronic-control phase retarder 2 is 45°, −45°, 135°, or −135°.

Further, the angle between the direction of the transmission axis of the linear polarization film 1 and the direction of the slow axis of the phase retardation plate 3 is in the range of 30° to 60°, in the range of −60° to −30°, in the range of 120° to 180°, or in the range of −180° to −120°. Preferably, the angle between the direction of the transmission axis of the linear polarization film 1 and the direction of the slow axis of the phase retardation plate 3 is 45°, −45°, 135°, or −135°.

Further, the pixelated electronic-control phase retarder 2 is a liquid crystal apparatus. The initial alignment of the liquid crystal apparatus is horizontal alignment on both sides, or vertical alignment on both sides, or horizontal alignment on one side and vertical alignment on the other side.

Further, the light source emits an ultraviolet light or a visible light, which can realize exposure of the polarization-sensitive medium 4.

Further, the light source is a laser or an LED. When the light source is a laser, the light source has good collimation and high energy. When the light source is an LED, the light source is non-collimated light, which has the characteristics of small size and low cost.

Further, the pixelated electronic-control phase retarder 2 may be of transmission type or reflection type. In this embodiment, the pixelated electronic-control phase retarder 2 can be connected to a computer for the design of the phase retardation distribution and for performing real-time refreshing.

In some embodiments, the pixelated electronic-control phase retarder 2 is a transmission liquid crystal apparatus with horizontal alignment, and the liquid crystal is positive with $\Delta\varepsilon > 0$, then:

When the voltage is zero, the phase retardation, i.e., the phase difference between the extraordinary beam and ordinary beam, is at the maximum value. The value is about $\delta = 2\pi\Delta n d/\lambda$, where $\Delta n$ is the birefringence index of the liquid crystal, d is the thickness of the liquid crystal cell, and $\lambda$ is the wavelength of the incident light.

As the voltage applied on a pixel gradually increases, the liquid crystal director is gradually reoriented from horizontal direction to vertical direction, so that the phase retardation of this pixel $\delta$ decreases gradually as the voltage increases;

When the voltage is high enough, the liquid crystal director is completely vertically reoriented, and the phase retardation $\delta$ is 0.

For the incident light, after passing through the linear polarization film 1, a pixel in the pixelated electronic-control phase retarder 2 that has a phase retardation of $\delta$, and a quarter wave plate, the Jones matrix of its polarization is expressed as:

$$\begin{bmatrix} 1 & 0 \\ 0 & j \end{bmatrix} \frac{\sqrt{2}}{2} \begin{bmatrix} 1 & 1 \\ -1 & 1 \end{bmatrix} \begin{bmatrix} 1 & 0 \\ 0 & e^{j\delta} \end{bmatrix} \frac{\sqrt{2}}{2} \begin{bmatrix} 1 & -1 \\ 1 & 1 \end{bmatrix} \begin{bmatrix} 0 & 0 \\ 0 & 1 \end{bmatrix} \begin{bmatrix} E_{xin} \\ E_{yin} \end{bmatrix} = jE_{yin} \begin{bmatrix} -\sin\frac{\delta}{2} \\ \cos\frac{\delta}{2} \end{bmatrix}$$

According to the calculation results, it can be found that the output light is linearly polarized light, its polarization direction is rotated by an angle of $-\delta/2$ with respective to the direction of the transmission axis of the linear polarization film, and its intensity is determined by the y component of the incident light.

In the case where the pixelated electronic-control phase retarder 2 has a maximum phase retardation of $2\pi$ and a minimum phase retardation of 0, any polarization rotation angle ranging from 0° to 180° can be realized.

Therefore, according to the above calculation results, the output light can have a desirable distribution of polarization direction on the pixel level. That is, in a local area (an area corresponding to one pixel) the output light is a linearly polarized light with the same polarization direction; and the output light is a linearly polarized light including different polarization directions in different local areas (areas corresponding to different pixels).

In some embodiments, due to the error, each point of the emitted light may be elliptically polarized light, but the long axis direction of the elliptically polarized light is similarly controlled by a pixelated electronic-control phase modulating apparatus to achieve a desirable patterned distribution.

With the current liquid crystal display technology and silicon-based liquid crystal technology, millions of pixels in electronic-control liquid crystal phase retarder can be driven by thin film transistor arrays, which is highly compatible with computers. The gray scale of any pixel can be assigned directly on a computer, so that the corresponding voltage distribution is generated in the pixelated electronic-control phase retarder 2 and accordingly the distribution of the phase retardation of any pixel is generated. As a result, the output light with a desirable distribution of the polarization direction is obtained.

After being exposed to sufficient light intensity, the polarization-sensitive medium 4, such as the Methyl red molecules which are randomly distributed in all directions initially, would have an absorption long axis perpendicular to the polarization direction (or the long axis direction of the elliptically polarized) eventually to obtain the most stable state. Therefore, the molecule alignment profile in the polarization-sensitive medium is determined by the pixelated electronic-control phase retarder 2.

In some embodiments, the pixelated electronic-control phase retarder 2 is a transmission liquid crystal apparatus with vertical alignment, and the liquid crystal is negative with $\Delta\varepsilon > 0$, then: Similarly, different voltages can produce different phase retardations.

Figure 2:
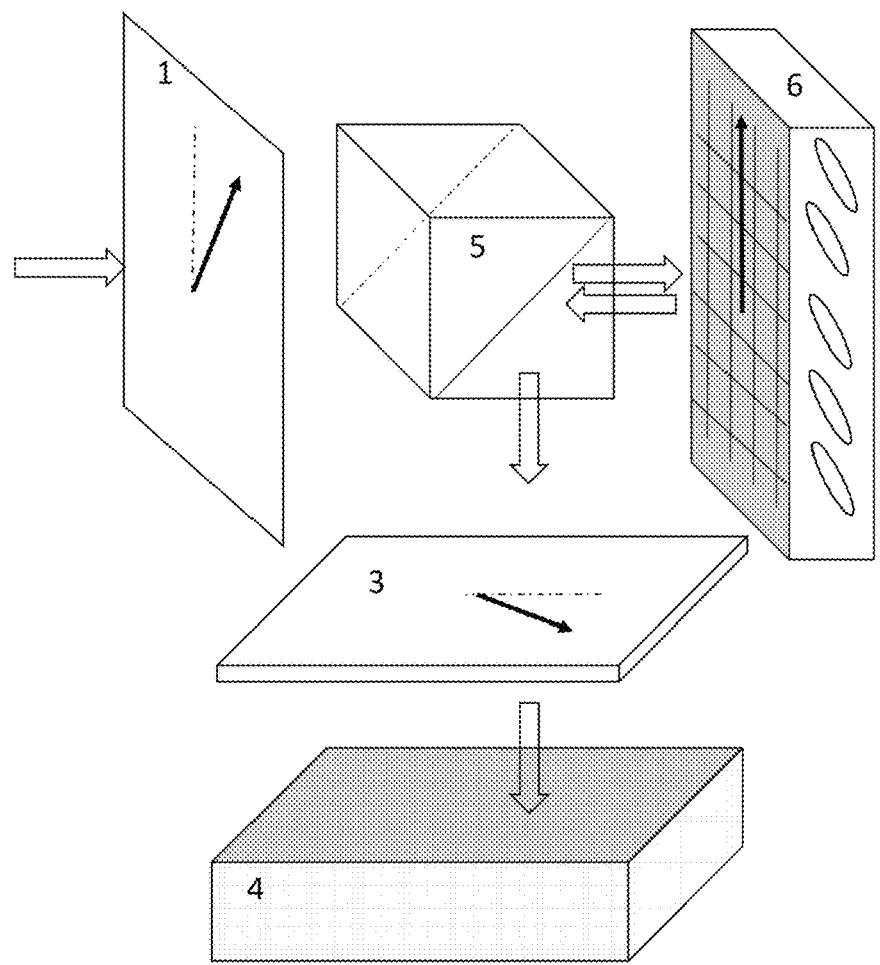
FIG. 2 is a schematic view of an apparatus according to some embodiments of the present invention.

In some embodiments of the present invention, the pixelated electronic-control phase retarder 2 may be reflection type, as shown in FIG. 2. Through the apparatus shown in FIG. 2, the light emitted from the light source passes through the linear polarization film 1, the splitting prism 5, reflection pixelated electronic-control phase retarder (liquid crystal on silicon modulator) 6, the splitting prism 5, and the quarter wave plate 3, and then forms an alignment profile with a desirable pattern in the polarization-sensitive recording medium 4. Compared with the transmission pixelated electronic-control phase retarders shown in FIG. 1, the reflection pixelated electronic-control phase retarders described in this embodiment may realize a doubled polarization rotation angle with the same material and liquid crystal cell thickness.

Embodiment 2

The present invention further discloses a method of manufacturing an optical element. The optical element is manufactured by using any one of the above-mentioned photo-alignment apparatuses which can realize a desirable distribution through a single exposure. The optical element includes a polarization-sensitive medium 4 and an optical anisotropic medium. The optical anisotropic medium has a local optic axis orientation profile. That is, the local optic axis orientation is variable along at least one direction on its surface and could be distributed in any pattern. The method of manufacturing the optical element includes the following steps:

generating an optic axis orientation profile of a polarization-sensitive medium 4 by the photo-alignment apparatus; and determining a local optic axis orientation profile of the optical anisotropic medium based on the optic axis orientation profile in the polarization-sensitive medium 4.

Further, the electro-optical performance of the optical element can be controllable via a voltage.

Further, the polarization-sensitive medium 4 and the optical anisotropic medium may be two separated layers of medium. Alternatively, the polarization-sensitive medium 4 and the optical anisotropic medium may be one layer of the mixture of two kinds of medium, or the same medium having both a polarization-sensitive characteristic and an optical anisotropy. For example, in the case 1 mentioned above, the polarization-sensitive medium 4 may be an alignment layer SD1 while the optical anisotropic medium may be a liquid crystal. In the case 2 mentioned above, the polarization-sensitive medium 4 may be methyl red while the optical anisotropic medium may be a liquid crystal. In the case 3, they may be made from some of the azobenzene polymers which have both polarization-sensitive property and optical anisotropy.

Further, the polarization-sensitive medium 4 and the optical anisotropic medium are both exposed to the light output from the photo-alignment apparatus. Alternatively, the optical anisotropic medium is not exposed to the light output from the photo-alignment apparatus, and is added into the optical element after a previous exposure.

Further, the polarization-sensitive medium 4 is a photo-alignment material or an azobenzene polymer, in which the alignment direction of the molecules can be varied according to the polarization direction of the incident light. The optical anisotropic medium is a liquid crystal, a liquid crystal polymer, or an azobenzene polymer.

Figure 4:
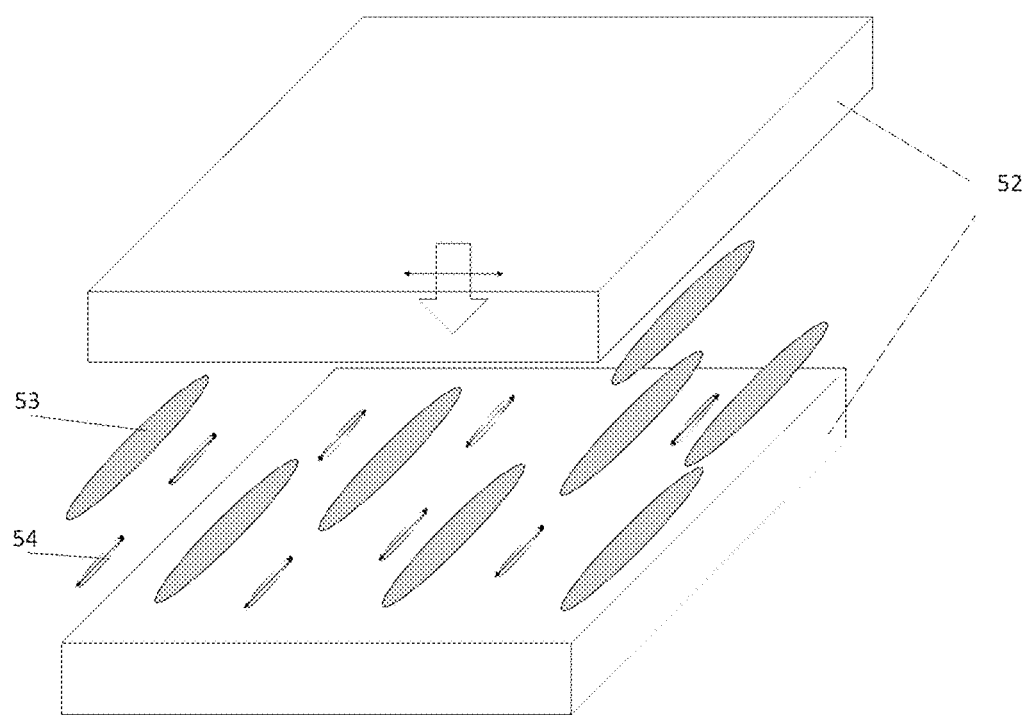
FIG. 4 is a photo-aligning process of the Embodiment 2 of the present invention.

In a specific embodiment, the apparatus of Embodiment 1 is used to manufacture the optical element having an optic axis orientation profile. The process of manufacturing the optical element includes: mixing liquid crystal 53 and polarization-sensitive medium 54 (such as E7 liquid crystal and methyl red) uniformly and then filling the obtained mixture into a preformed liquid crystal cell to be exposed using the apparatus in the Embodiment 1. Here, the methyl red is used as the polarization-sensitive medium 54, and the E7 liquid crystal is used as the optical anisotropic medium. The preformed liquid crystal cell comprises two layers of indium tin oxide (ITO) glass and the spacers between them are used to control the thickness of the liquid crystal cell. The effective area of the liquid crystal cell is sealed with glue, leaving two holes on the front side and back side respectively for the injecting of the liquid crystal 53. The light output from the apparatus in Embodiment 1 has a polarization distribution profile. As a result the methyl red molecules in different regions of the liquid crystal cell are arranged in different alignment directions, which further drive the directors of the E7 liquid crystal to different alignment directions. In this way, an apparatus with liquid crystal optic axis that is variable in a desirable pattern in the plane of the glass substrate can be manufactured. The exposure process is shown in FIG. 4, in which the ITO glasses are indicated by 52, the liquid crystal is indicated by 53, as well as the polarization-sensitive medium is indicated by 54.

In particular, in the case where the cell thickness of the liquid crystal cell is controlled properly, when the phase difference of the liquid crystal at any position is a fixed value, the directions of the optic axis of the liquid crystal vary spatially in the two-dimensional plane defined by the glass substrate so as to form a geometric phase hologram.

Figure 5:
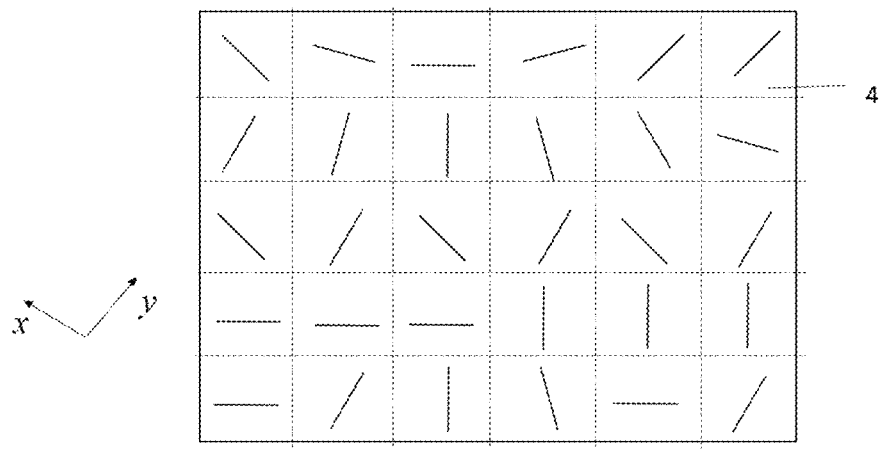
FIG. 5 shows the geometric phase hologram which has a desirable distribution of the liquid crystal optic axes and is generated using a pixelated electronic-control liquid crystal phase retarder with 6×5 pixels in Embodiment 2.

FIG. 5 shows the geometric phase hologram which has a desirable distribution of the local optic axes and is generated by the pixelated electronic-control liquid crystal phase retarder with 6×5 pixels.

Figure 6:
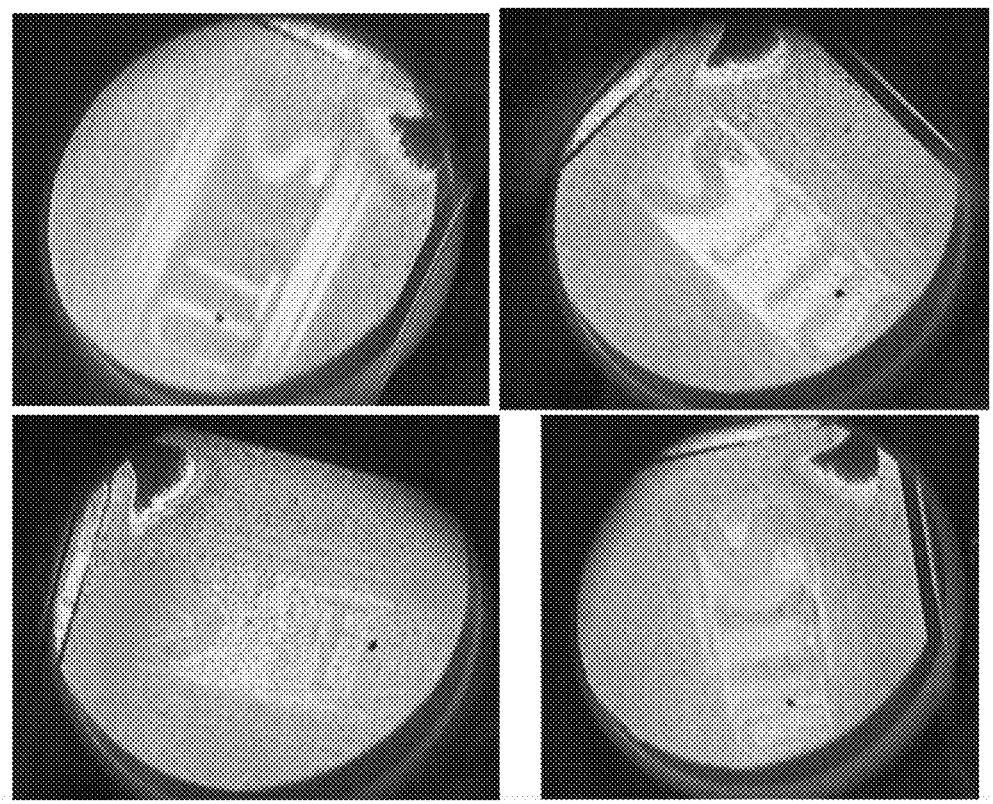
FIG. 6 is a photograph of a geometric phase hologram illustrating an abbreviation of a school name prepared in Embodiment 2.

FIG. 6 shows a geometric phase hologram illustrating the abbreviation of a school name. It is generated as follows. The computer is used to generate "S", "J", "T", "U" and background. Each letter or background has a different gray level. Such a grayscale image may be projected onto the pixelated tunable phase retarder, and beams of light forming the grayscale image may be modulated by the pixelated tunable phase retarder on the pixel level. The pixelated tunable phase retarder may output modulated beams of light forming a corresponding image of the grayscale image, where each letter or background corresponds to linearly polarized light with a different polarization direction. After exposure, the liquid crystal cell, which has been filled with a mixture of E7 and methyl red, may be configured to have an alignment pattern in which different regions have different liquid crystal optic axis. The liquid crystal cell shown in FIG. 6 is obtained by rotating the liquid crystal cell sandwiched between two crossed polarizers. It can be seen that, the brightness of "S", "J", "T", "U" and the background change with the rotation angle of the liquid crystal cell, as the local optic axes directions of the methyl red and the liquid crystal are aligned according to a given grayscale image. The contrast is not very high, as the light source used herein emits white light rather than monochromatic light.

Figure 7:
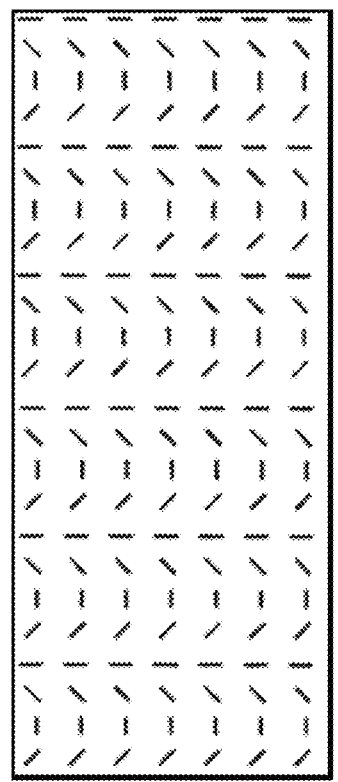
FIG. 7 shows the optic axis distribution pattern of a geometric phase grating having continuously changing axis direction that can be manufactured by the method according to the present invention.
Figure 8:
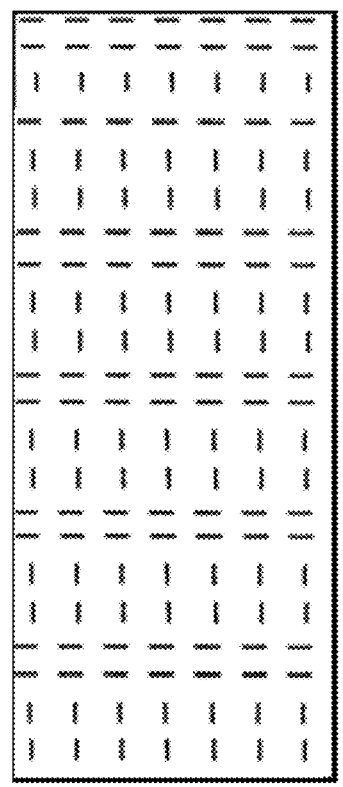
FIG. 8 shows the optic axis distribution pattern of the geometric phase grating having only two axis directions that can be manufactured by the method according to the present invention.

FIG. 7 shows the optic axis distribution pattern of a geometric phase grating having continuously changing optic axis directions that can be manufactured by this method. FIG. 8 shows the optic axis distribution pattern of the geometric phase grating having only two axis directions. The optic axis distribution pattern may be obtained through exposing the liquid crystal cell having a mixture of E7 and methyl red using the apparatus in FIG. 2. To prove that the optic axis of the liquid crystals has such a periodic orientation, red light (633 nm), which is not absorbed by methyl red, is adopted to irradiate the liquid crystal cell, and grating diffraction was observed.

In some embodiments, the optical anisotropic layer in the obtained geometric phase hologram may be a positive liquid crystal. A voltage perpendicular to the substrate may be applied to gradually rotate the optic axis of the liquid crystal from originally parallel to the substrate to the direction parallel to the electric field. In this way, the local phase difference of the geometric phase hologram can be adjusted by voltages, so that its electro-optical property can be adjusted. When the applied voltage is relatively high, the optic axis of the liquid crystal is almost perpendicular to the substrate without any phase retardation, so that the geometric phase hologram disappears. However, this manufacturing method is not limited to manufacturing liquid crystal apparatus.

Figure 3:
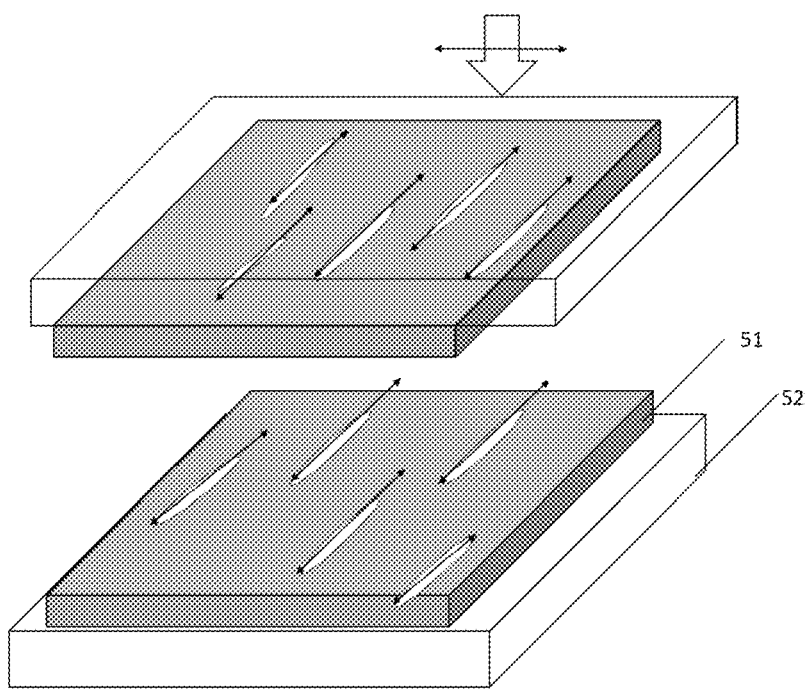
FIG. 3 is a photo-aligning process of some embodiments of the present invention.

In other examples of the manufacturing method according to the present invention, the recording material, i.e., polarization-sensitive medium, is a photo-alignment layer 51, and the optical anisotropic medium is a liquid crystal. The photo-alignment layer 51 is spin-coated on ITO glass 52. Two pieces of ITO glass 52 coated with the photo-alignment layer 51 are sealed with UV glue, using spacers to control the space therebetween, so as to form an empty liquid crystal cell. The photo-alignment layers 51 are both on the inner side of the empty liquid crystal cell, used to align the liquid crystal. One such empty liquid crystal cell is placed at the location where the polarization-sensitive recording medium 4 is in FIG. 1 or FIG. 2. A computer can be used to control the voltage applied to each pixel of the pixelated electronic-control phase retarder 2, so as to control the local alignment direction of the molecules of the photo-alignment layer 51. The exposure process is shown in FIG. 3, where the photo-alignment layer is indicated by 51, the ITO glass slices are indicated by 52. Then the liquid crystal is filled into the cell, and the liquid crystal director profile would be arranged depending on the local orientation direction of the photo-alignment layer. The liquid crystal directors are arranged substantially parallel to the glass substrate, and their arrangement directions in the (glass substrate) plane are determined by the orientation arrangement of the photo-alignment layers 51 in the corresponding regions. In this way, an apparatus with liquid crystal optic axis that is variable in desirable pattern in the plane of the glass substrate can be manufactured.

In some examples of the present invention, there may be an optical system between the pixelated electronic-control phase modulating apparatus and the polarization-sensitive medium to adjust the beam size so as to obtain the required exposure precision and exposure area.

In some examples, the polarization-sensitive polymer may serve as polarization-sensitive medium, and have optical anisotropic property. In this way, a geometric phase hologram can also be generated similarly.

According to the present disclosure, a light provided by the light source may sequentially pass though the linear polarization film, the pixilated electronic-control phase retarder, and the phase retardation plate.

In some embodiments, the phase retardation plate may be a non-variable phase retarder, and more specifically, it may include a quarter wave plate (QWP). A coordinate system is created with the propagating direction of light being z-axis, with the direction of the slow axis of the QWP being y-axis, with the direction of the fast axis of the QWP being x-axis. The direction of the transmission axis of the linear polarization film may be the y-axis direction, and the polarization direction of the linearly polarized extraordinary light (also referred to as linearly polarized e-ray) in the pixelated electronic-control phase retarder may be in the x-y plane, and may have an angle of 45° with respective to the y-axis.

The linear polarization film may be configured to convert the light from the light source into first linearly-polarized light having a polarization direction parallel to the direction of the transmission axis of the linear polarization film.

Pixels of the pixelated electronic-control phase retarder may be respectively controlled through corresponding voltages to provide predetermined phase retardations to the first linearly polarized light. That is, each pixel of the pixelated electronic-control phase retarder may be configured to provide a predetermined phase retardation to the first linearly polarized light according to a voltage applied to the pixel. The phase retardations provided by the respective pixels may be the same or different. Therefore, local phase retardations may be controlled by the pixilated electronic-control phase retarder on the pixel level, and the pixilated electronic-control phase retarder may provide a predetermined distribution of the phase retardations to the first linearly polarized light through controlling the voltages of the respective pixels of the pixelated electronic-control phase retarder.

The linearly polarized o-ray and e-ray after passing through a pixel of the pixelated electronic-control phase retarder may have a substantially identical amplitude and a phase difference of δ. After passing through the phase retardation plate, the linearly polarized o-ray and e-ray may become circularly polarized rays with opposite handedness and a phase difference of δ, where δ may be determined by the voltage applied to the pixel. The circularly polarized rays with opposite handedness and a phase difference of δ may be superposed, thereby generating second linearly polarized light with a polarization direction determined by δ. In some embodiments, the polarization direction of the second linearly polarized light may be oriented relative to the y-axis by δ/2. In some embodiments, the light output from the phase retardation plate may be elliptically polarized light, and its long axis may be determined by δ.

Through controlling the voltages of the respective pixels of the pixelated electronic-control phase retarder, local polarization directions of the second linearly polarized light may be controllable on the pixel level and, accordingly, a predetermined 2D polarization direction distribution of the second linearly polarized light may be generated. After exposure to the second linearly polarized light, an optic axis orientation profile of the polarization-sensitive medium 4 may be configured according to the predetermined 2D polarization direction distribution of the second linearly polarized light. The polarization-sensitive medium 4 having the configured optic axis orientation profile may provide a predetermined optical function.

Figure 9:
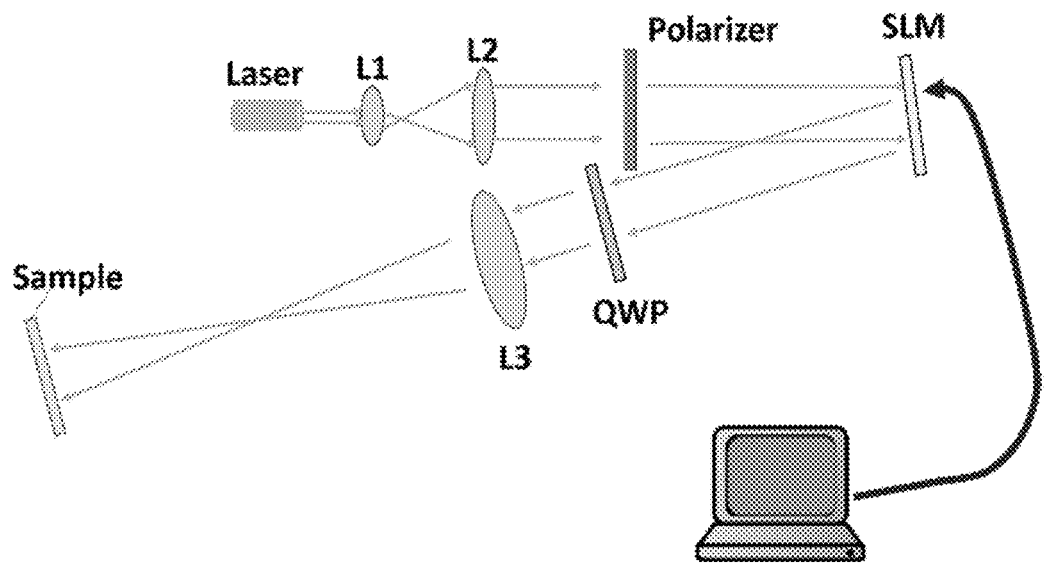
FIG. 9 is a schematic view of an apparatus according to some embodiments of the present invention.
Figure 10:
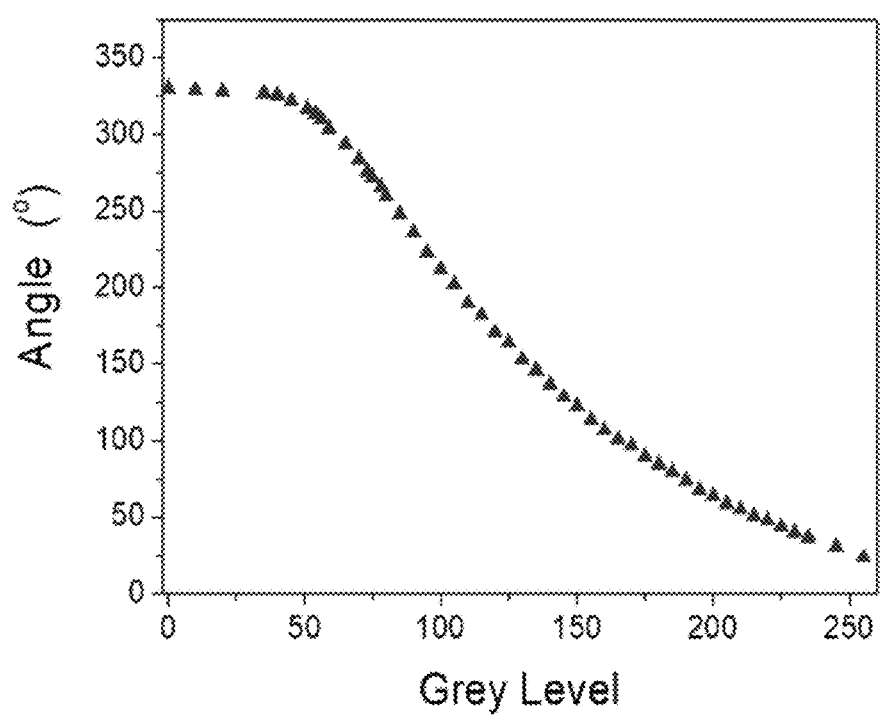
FIG. 10 shows the orientation angle of the analyzer versus grey level of the electronic-control liquid crystal phase retarder when minimum light intensity for the light output from the image lens L3 is achieved according to the embodiment in FIG. 9.

As shown in FIGS. 9 and 10, the photo-alignment apparatus may include a light source, a linear polarization film, a pixelated electronic-control phase retarder, and a phase retardation plate. The light source may include a laser. The linear polarization film may include a linear polarizer. The pixelated electronic-control phase retarder may include a reflective liquid-crystal-on-Silicon (LCoS) SLM. The phase retardation plate may include a QWP. A beam expander (lenses L1 and L2) may be disposed between the laser and the polarizer, and an imaging lens L3 may be disposed between the QWP and a sample of a polarization-sensitive medium. In some embodiments, the polarization-sensitive medium may include an MR-LC mixture including about 99% E7 and about 1% photo-sensitive azo-dye methyl red (MR, Sigma Aldrich). The SLM may be a pure phase SLM (model: PLUTO-VIS, Holoeye) with homogeneous alignment. The image lens L3 may be configured to image the SLM onto the sample, e.g., the sample may be disposed at the image plane of the SLM. The generated 2D polarization direction distribution of the second linearly polarized light output from the QWP may align LC molecules in the sample.

An analyzer (not drawn in FIG. 9 may be disposed between the imaging lens L3 and the image plane of the SLM, to examine the polarization of a light output from the image lens L3. When the SLM is loaded with uniform grey-level pictures, the analyzer may be configured to output a minimum light intensity for the light output from the image lens L3, via rotating or orientating its absorption axis to be parallel to the output linear polarization. The measured orientation angle of the analyzer versus grey level is plotted in FIG. 10. As the SLM provides more than $3\pi$ phase change for the light of 532 nm, the polarization rotation range is more than 300° as grey level goes from 0 to 255, as FIG. 10 shows. Such a wide range may be sufficient for realizing an arbitrary LC orientation. Moreover, a very fine angular resolution (1°) may be achieved. In some embodiments, the analyzer may be a linear polarizer.

According to the data shown in FIG. 10, a polarization pattern including a plurality of different orientation domains having different grey levels may be generated by the SLM. For discussion purposes, an LC cell (no alignment layer) filled with the MR-LC mixture may be placed at the image plane of the SLM, as shown in FIG. 9, and exposed to the polarization pattern with a light intensity of about 40 mW/cm$^2$ for about 10 minutes. The temperature of the LC cell may be kept at 67° C. (isotropic) during the entire exposure process to realize a double-side photo alignment. After exposure, a plurality of domains with different local MR/LC orientations may be generated simultaneously in the LC cell. The plurality of domains with different MR/LC orientations may be one-to-one corresponding to the plurality of different orientation domains in the polarization pattern. The optic axes of the LC in the LC cell may be configured to have orientations according to the polarization pattern provided by the SLM. The polarization pattern may be dynamically updated by the computer-controlled SLM, without the need for pre-made masks. In this way, an LC optical element having optic axes varying in a desirable pattern may be manufactured though a single exposure. For example, after a one-step photo-patterning, different local LC orientations may be realized simultaneously in the LC cell, forming geometric phase devices with arbitrary phase distributions. The single exposure may greatly simplify the fabrication process and increase yield, and have great potential for various geometric phase device fabrications.

The above is only the specific embodiment of the present disclosure, but the scope of the present invention e is not limited thereto. Any person skilled in the art can readily conceive modification or substitutions within the technical scope of the present disclosure, which should fall within the scope of protection of the present disclosure. Therefore, the scope of protection of the present disclosure should be defined by the scope of the appending claims.

What is claimed is:

1. A photo-alignment apparatus comprising:
a light source, configured to provide first light;
a linear polarization film, configured to receive the first light from the light source and convert the first light into second light, which is linearly-polarized light having a polarization direction parallel to a direction of a transmission axis of the linear polarization film;
a pixelated electronic-control phase retarder, including pixels which are respectively controlled by corresponding voltages to provide predetermined phase retardations to the second light on a pixel level, the pixelated electronic-control phase retarder is configured to convert the second light into a plurality of beams of third light having polarization states respectively corresponding to the predetermined phase retardations; and
a phase retardation plate, configured to provide a non-pixelated phase retardation to the third light and output a plurality of beams of fourth light with a predetermined polarization direction distribution on the pixel level.

2. The photo-alignment apparatus according to claim 1, wherein the pixelated electronic-control phase retarder is a liquid crystal device, an initial alignment of the liquid crystal device is a homogeneously alignment, or a homeotropic alignment, or a hybrid alignment including a horizontal alignment at a first side and a homeotropic alignment at an opposing second side.

3. The photo-alignment apparatus according to claim 1, wherein the pixelated electronic-control phase retarder is a transmission type phase retarder or a reflection type phase retarder.

4. The photo-alignment apparatus according to claim 1, wherein the light source emits ultraviolet light or visible light.

5. The photo-alignment apparatus according to claim 1, wherein the light source includes a laser or an LED.

6. The photo-alignment apparatus according to claim 1, wherein the phase retardation plate is a non-variable phase retarder.

7. The photo-alignment apparatus according to claim 1, further comprising: one or more optical elements disposed before, after, or between the linear polarization film, the pixelated electronic-control phase retarder, and the phase retardation plate.

8. The photo-alignment apparatus according to claim 7, wherein the one or more optical elements includes at least one of a lens, a lens group, a reflector, an attenuation sheet, an aperture, a phase retarder, a polarizer, a beam expander, a filter, a prism, an optical window, an optical substrate, a beam displacement optical element, a diffractive optical element or a polarization rotation apparatus.

9. The photo-alignment apparatus according to claim 1, wherein the non-pixelated phase retardation generated by the phase retardation plate is between π/4+mπ and $$\frac{3}{4}\pi + m\pi,$$

where m is an integer.

10. The photo-alignment apparatus according to claim 9, wherein the non-pixelated phase retardation provided by the phase retardation plate is an odd multiple of π/2.

11. The photo-alignment apparatus according to claim 1, wherein an angle between the direction of the transmission axis of the linear polarization film and a polarization direction of an extraordinary beam incident vertically within the pixelated electronic-control phase retarder is in a range of 30° to 60°, in a range of −60° to −30°, in a range of 120° to 150°, or in a range of −150° to −120°.

12. The photo-alignment apparatus according to claim 11, wherein the angle between the direction of the transmission axis of the linear polarization film and the polarization direction of the extraordinary beam incident vertically within the pixelated electronic-control phase retarder is 45°, −45°, 135°, or −135°.

13. The photo-alignment apparatus according to claim 1, wherein an angle between the direction of the transmission axis of the linear polarization film and a direction of a slow axis of the phase retardation plate is in a range of 30° to 60°, in a range of −60° to −30°, in a range of 120° to 180°, or in a range of 180° to −120°.

14. The photo-alignment apparatus according to claim 13, wherein the angle between the direction of the transmission axis of the linear polarization film and the direction of the slow axis of the phase retardation plate is 45°, −45°, 135°, or −135°.

15. A method of manufacturing an optical element including a polarization-sensitive medium and an optically anisotropic medium, comprising:

providing, by a light source, first light;

converting, by a linear polarization film, the first light into second light, which is linearly-polarized light;

providing, by a pixelated electronic-control phase retarder, predetermined phase retardations to the second light on a pixel level, and converting, by the pixelated electronic-control phase retarder, the second light into a plurality of beams of third light having polarization states respectively corresponding to the predetermined phase retardations;

providing, by a phase retardation plate, a non-pixelated phase retardation to the third light, and outputting a plurality of beams of fourth light with a predetermined polarization direction distribution on the pixel level toward the polarization-sensitive medium.

16. The method of manufacturing an optical element according to claim 15, further comprising:

exposing the polarization-sensitive medium to the fourth light with a predetermined polarization direction distribution on the pixel level, wherein an optic axis orientation profile of the polarization-sensitive medium is generated after a single exposure; and generating a profile of local orientations of optically anisotropic molecules in the optically anisotropic medium based on the optic axis orientation profile in the polarization-sensitive medium.

17. The method of manufacturing an optical element according to claim 15, wherein an electro-optical property of the optical element is controllable via a voltage.

18. The method of manufacturing an optical element according to claim 15, wherein the polarization-sensitive medium and the optical anisotropic medium are in a form of two separated layers, one layer including a mixture of the polarization-sensitive medium and the optical anisotropic medium, or a same medium having both a polarization-sensitive property and an optical anisotropy.

19. The method of manufacturing an optical element according to claim 15, wherein the polarization-sensitive medium and the optical anisotropic medium are both exposed to the fourth light output from the phase retardation plate; or the optical anisotropic medium is not exposed to the fourth light output from the phase retardation plate, and is added into the optical element after the polarization-sensitive medium is exposed to the fourth light output from the phase retardation plate.

20. The method of manufacturing an optical element according to claim 15, wherein the polarization-sensitive medium includes a photo-alignment material or an azobenzene polymer, and the optical anisotropic medium includes a liquid crystal, a liquid crystal polymer, or an azobenzene polymer.

* * * * *